United States Patent
Malone et al.

(10) Patent No.: US 6,231,640 B1
(45) Date of Patent: May 15, 2001

(54) DISSOLVING PETROLEUM COKE IN MOLTEN IRON TO RECOVER VANADIUM METAL

(75) Inventors: Donald P. Malone, Grayson, KY (US); Thomas C. Holcombe, Neshanic Station, NJ (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

(21) Appl. No.: 09/324,300

(22) Filed: Jun. 2, 1999

Related U.S. Application Data
(60) Provisional application No. 60/088,630, filed on Jun. 9, 1998.

(51) Int. Cl.⁷ .................................................. C22B 34/22
(52) U.S. Cl. ................................. 75/532; 75/561; 75/622
(58) Field of Search .............................. 75/622, 561, 532

(56) References Cited

U.S. PATENT DOCUMENTS

| | | | | |
|---|---|---|---|---|
| 2,467,039 | * | 4/1949 | Kerschbaum et al. | 75/622 |
| 3,579,328 | * | 5/1971 | Aas et al. | 75/500 |
| 3,637,370 | * | 1/1972 | Buker | 75/504 |
| 4,071,355 | | 1/1978 | Staggers | 75/530 |
| 4,203,759 | | 5/1980 | Metrailer et al. | 75/363 |
| 4,243,639 | | 1/1981 | Haas et al. | 423/63 |
| 4,345,990 | | 8/1982 | Fahlstrom et al. | 208/404 |
| 4,443,415 | | 4/1984 | Queneau et al. | 423/68 |
| 4,708,819 | | 11/1987 | Vasconcellos et al. | 252/373 |
| 4,816,236 | | 3/1989 | Gardner | 423/65 |
| 4,849,015 | * | 7/1989 | Fassbinder et al. | 75/501 |
| 5,259,864 | | 11/1993 | Greenwalt | 75/445 |
| 5,277,795 | | 1/1994 | Thornhill et al. | 208/251 R |
| 5,324,341 | | 6/1994 | Nagel et al. | 75/503 |
| 5,427,603 | | 6/1995 | Samant et al. | 75/622 |
| 5,484,554 | | 1/1996 | Vuong et al. | 252/373 |
| 5,772,726 | * | 6/1998 | Woods et al. | 75/10.22 |

OTHER PUBLICATIONS

Lankford et al, The Making, Shaping and Treating of Steel, 10th edition, 1985, p. 400, No month.*

* cited by examiner

Primary Examiner—Roy King
Assistant Examiner—Tima McGuthry-Banks
(74) Attorney, Agent, or Firm—Richard D. Stone

(57) ABSTRACT

A process for the recovery of vanadium from a petroleum coke or heavy hydrocarbon feed comprising dissolving the feed in a molten metal bath to which oxygen containing gas is added to maintain heat balance and burn off carbon. Preferably the feed is added via a high pressure nozzle as a coke/steam mixture discharged down into a molten metal bath. Preferably the net gas make from the molten metal reactor is quenched and/or cooled to permit dust recovery, with recycle of dust to the molten metal reactor. An iron/vanadium product is withdrawn from the molten metal reactor as a product.

21 Claims, 1 Drawing Sheet

DISSOLVING PETROLEUM COKE IN MOLTEN IRON TO RECOVER VANADIUM METAL

This application claims priority to provisional application No. 60/088,630 filed Jun. 9, 1998.

Many refiners are now forced to process more difficult stocks, which are heavier and more metals contaminated. Many heavy crudes contain significant amounts of vanadium and sulfur and frequently with lesser amounts of Ni, Fe and other metal compounds.

Such heavy crudes are difficult to process catalytically, so an initial stage of thermal processing, usually some form of coking, is typically used to free distillable, relatively metals free products from vanadium containing coke. The coker gas oil and coker naphtha are essentially free of metals and may be processed by conventional catalytic upgrading processes to produce high quality transportation fuels and other hydrocarbon products. Unfortunately, coking of these difficult crudes produces large amount of coke, a solid product with an enhanced concentration of vanadium and sulfur and other metals present in the charge to the coker.

Many cokers produce coke which is so contaminated with metals and sulfur that it has little value as fuel. The sulfur generally precludes of coke in cement kilns. Such materials usually have enough vanadium to cause processing problems but too low a vanadium concentration to make vanadium recovery economically attractive.

Some coking processes, such as fluid bed cokers, especially those employing gasifiers, can produce large amounts of fine, low density coke particles which is especially difficult to treat using conventional technology.

To illustrate just how difficult it is to process vanadium rich cokes, some representative prior art processes are reviewed below. U.S. Pat. No. 4,203,759, Metrailer et al, PROCESS FOR THE PREPARATION OF A VANADIUM-CONTAINING METALLIC ASH CONCENTRATE, taught heating partially gasified coke at relatively with oxygen containing gas to produce low density ash. Most ash particles produced had a diameter of less than 1 micron. The fine ash was readily processed with sulfuric acid to recover vanadium.

U.S. Pat. No. 4,243,639, Haas et al, METHOD FOR RECOVERING VANADIUM FROM PETROLEUM COKE, taught gasifying the coke with steam in the presence of an alkali metal salt to improve V recovery during subsequent processing steps.

U.S. Pat. No. 4,345,990, Fahlstrom et al, METHOD FOR RECOVERING OIL AND/OR GAS GROM CARBONACEOUS MATERIALS, taught use of two molten baths to process a variety of carbon containing wastes. A lead or zinc first bath operated at 500 C. to thermally devolatilize the carbonaceous material, while the second bath of molten iron operated at 1200 C. and operated with oxygen to gasify residual quantities of carbon.

U.S. Pat. No. 4,443,415, Queneau et al, RECOVERY OF V2O5 AND NICKEL VALUES FROM PETROLEUM COKE, taught slurrying coke in an aqueous solution of sodium carbonate to increase V recovery.

U.S. Pat. No. 4,708,819, Vasconcellos et al, REDUCTION OF VANADIUM IN RECYCLE PETROLEUM COKE, taught the problems of high vanadium levels during partial oxidation (the vanadium forms eutectics with refractory walls, melting them). The vanadium content of recycled, unconverted coke was reduced by froth flotation treatment.

U.S. Pat. No. 4,816,236 Gardner, RECOVERY OF VANADIUM AND NICKEL FROM PETROLEUM RESIDUES, taught recovering vanadium from various Flexicoke residues with varying V contents and particle sizes. The patent reported that Flexicoke from the heater bed had 1–5 wt % vanadium pentoxide, while coke from the cyclone venturi fines had 8–12 wt % vanadium pentoxide. Coke from the wet scrubber had as much as 20 wt % vanadium pentoxide. The patentee taught mixing coke with NaOH, burning and then leaching to recover vanadium. A majority of the Ni was reported to be left in the solids after the leach step.

U.S. Pat. No. 5,259,864, Greenwalt, METHOD OF DISPOSING OF ENVIRONMENTALLY UNDESIRABLE MATERIAL AND PROVIDING FUEL FOR AN IRON MAKE PROCESS E.G., PETROLEUM COKE, taught using a sulfur and heavy metal containing petroleum coke in a melter. The coke was mostly burned to form a fluidized bed of coke which was then reacted with ore and oxygen to make molten iron or steel preproducts. A slag layer contained sulfur freed during combustion of the petroleum coke.

U.S. Pat. No. 5,277,795, Thornhill et al, PROCESS AND APPARATUS FOR RECOVERING HEAVY METAL FROM CARBONACEOUS MATERIAL, taught burning petroleum coke to produce ash then processing the ash to extract metallic compounds.

U.S. Pat. No. 5,324,341, Nagel et al, METHOD FOR CHEMICALLY REDUCING METALS IN WASTE COMPOSITIONS, taught molten metal processing of metal containing wastes. Multiple reducing agents reduced oxygen-containing metals compounds in a metal-containing waste composition. Claim 24 mentioned use of an oxide of V as an oxidizing agent.

U.S. Pat. No. 5,427,603, Samant et al, METHOD OF TREATING A VANADIUM-CONTAINING RESIDUE, taught processing petroleum coke with air at 850 C. in a fluidized bed with an inert bed of granular iron oxide with an oxygen partial pressure between 10-4 bar and 10-6 bar to produce ash. The ash was then processed over a magnetic separator to recover the inert iron oxide for recycle.

U.S. Pat. No. 5,484,554 Vuoung et al, OXIDANT INJECTION FOR IMPROVED CONTROLLED OXIDATION, taught processing of coke in a partial oxidation reactor. The V in the coke forms a V rich slag in the reactor.

While not related directly to processing coke, U.S. Pat. No. 4,071,355, Staggers, RECOVERY OF VANADIUM FROM PIG IRON, taught removal of vanadium from pig iron to produce a vanadium rich slag by oxidizing molten pig iron at 2600–2900 F.

The teachings of these patents, which are incorporated by reference, could be summarized as follows.

Vanadium in petroleum containing coke is difficult to recover directly, that is, from the coke, because it is in a form which does not lend itself to conventional leaching approaches. The carbon, probably present in the form of condensed chelating structures, effectively shields significant portions of the metal from conventional leaching solutions.

Vanadium in coke can be recovered much more readily after combustion, because the vanadium in the ash produced is more susceptible to leaching, though even here some treatment, such as with sodium carbonate or sodium hydroxide was needed to improve metal recovery during leaching.

We wanted to develop a more direct and efficient method of recovering vanadium from petroleum coke.

We discovered that a molten metal process, originally developed to produce high purity hydrogen or synthesis gas from various waste streams, could be modified to process vanadium containing coke and directly recover the metal values.

Details of the basics or a preferred molten metal process are disclosed in one or more of the following patents, which are incorporated by reference.

U.S. Pat. No. 5,755,839, MOLTEN METAL REACTOR SWING SYSTEM AND PROCESS

U.S. Pat. No. 5,645,615, MOLTEN DECOMPOSITION APPARATUS AND PROCESS.

U.S. Pat. No. 5,577,346 MULTI-ZONE MOLTEN-METAL HYDROGEN AND FUEL GAS GENERATION PROCESS

U.S. Pat. No. 5,435,814, MOLTEN METAL DECOMPOSITION APPARATUS.

The process defined by the above four patents could tolerate a great many feeds, including coal and trash, but was primarily directed to production of relatively pure hydrogen gas at superatmospheric pressure. This work was not directed toward vanadium recovery from petroleum coke.

The prior art work that was directed to vanadium recovery required too many steps and consumed too much in the way of utilities and reagents. It generally involved burning the coke to form ash, or treating the coke with alkali metal to improve subsequent leaching steps.

We discovered that the best way to recover the V in the coke was to use a special form of molten metal processing to dissolve the carbon and vanadium. The carbon, probably present in the form of a collapsed metalo-porphyrin surrounding an atom of vanadium metal, dissolved readily in the molten iron bath, freeing the vanadium and permitting rapid and complete dissolution of the vanadium metal in the molten iron bath.

The process was fast and simple—no special processing of the coke was needed. The coke may be dry, but the process works well on coke containing some water. Heat/utility requirements were low, in fact the worse the feed in terms of % V in the coke, the more heat the process generates per weight of vanadium recovered. The process was tolerant of many other impurities found in coke containing feed, such as Ni and S compounds.

BRIEF SUMMARY OF THE INVENTION

Accordingly, the present invention provides a method of processing vanadium containing carbonaceous materials comprising dissolving V containing coke in a molten metal bath, preferably a molten iron bath to produce a molten metal bath containing dissolved carbon and dissolved vanadium metal; exothermically oxidizing at least a portion of said dissolved carbon from said bath to produce carbon oxides which are removed from said bath as a product of the process to produce a heated bath containing dissolved V metal and wherein said oxidation is controlled and limited to maintain a predetermined minimum coke level, preferably at least 1.0 wt % carbon, in said bath and produce a heated, carbon and V containing bath; dissolving additional amounts of V containing coke in said heated, carbon and V containing bath, and repeating said exothermic oxidization and dissolution of V containing coke, while maintaining said predetermined minimum carbon level, to produce a molten metal bath containing more wt % vanadium metal as a dissolved metal than wt % carbon.

Preferably, coke processing continues until the bath contains at least 10 wt % V, more preferably at least 20 wt % V, and most preferably 40 wt % V.

After the desired V concentration is achieved in the bath, the bath may be dumped and wholly or partially replaced with fresh iron.

In preferred embodiments, the bath is run at superatmospheric pressure, preferably 2 to 200 atm. High pressure operation allows higher feedstock rates without excessive carryover of dust. Higher pressures also increase the rate at which carbon in feedstock dissolves in the molten metal bath.

Preferably oxygen or other oxygen containing gas, is continuously introduced into the bath to produce CO and control carbon concentration. More preferably the carbon content is in excess of 2 wt %, still more preferably in excess of 4 wt % and may be the solubility limit in pure iron at the same temperature such that formation of a V/Fe solution is needed to dissolve such carbon levels. The presence of large amounts of carbon dissolved in the molten metal bath ensures strongly reducing conditions which keeps the V in the metallic phase.

Presence of large amounts of carbon also permits processing of sulfur rich coke with much or essentially all of the sulfur content released as H2S, which can be readily processed in a refinery Claus unit or other H2S recovery process.

When desired, multiple zone processing of the coke, alone or admixed with a hydrocarbon, may be practiced to permit recovery of a relatively pure hydrogen stream.

To maintain heat balance, it may be desirable to conduct, simultaneously or sequentially, one or more endothermic reactions. Steam may be added to endothermically react with the carbon dissolved in the molten iron bath to produce a hydrogen rich synthensis gas. Hydrogen rich hydrocarbons may be added with the coke, or separately added to a different portion of a circulating metal bath, or the bath may cycle between endothermic reactions (coke processing) and endothermic reactions (process methane, etc.). By isolating the processing of the hydrogen rich feed it is possible to obtain a high purity hydrogen stream. sooting downstream of carbon rich gas, problems of having a continuous process, especially when operated at superatmospheric pressure.

BRIEF DESCRIPTION OF THE DRAWING

The FIGURE is a simplified schematic drawing of a preferred embodiment wherein sulfur and vanadium containing coke is converted into H2S, an iron-vanadium metal, and a hydrogen rich syngas product using a molten metal reactor.

DETAILED DESCRIPTION OF PREFERRED EMBODIMENTS

Figure 1:
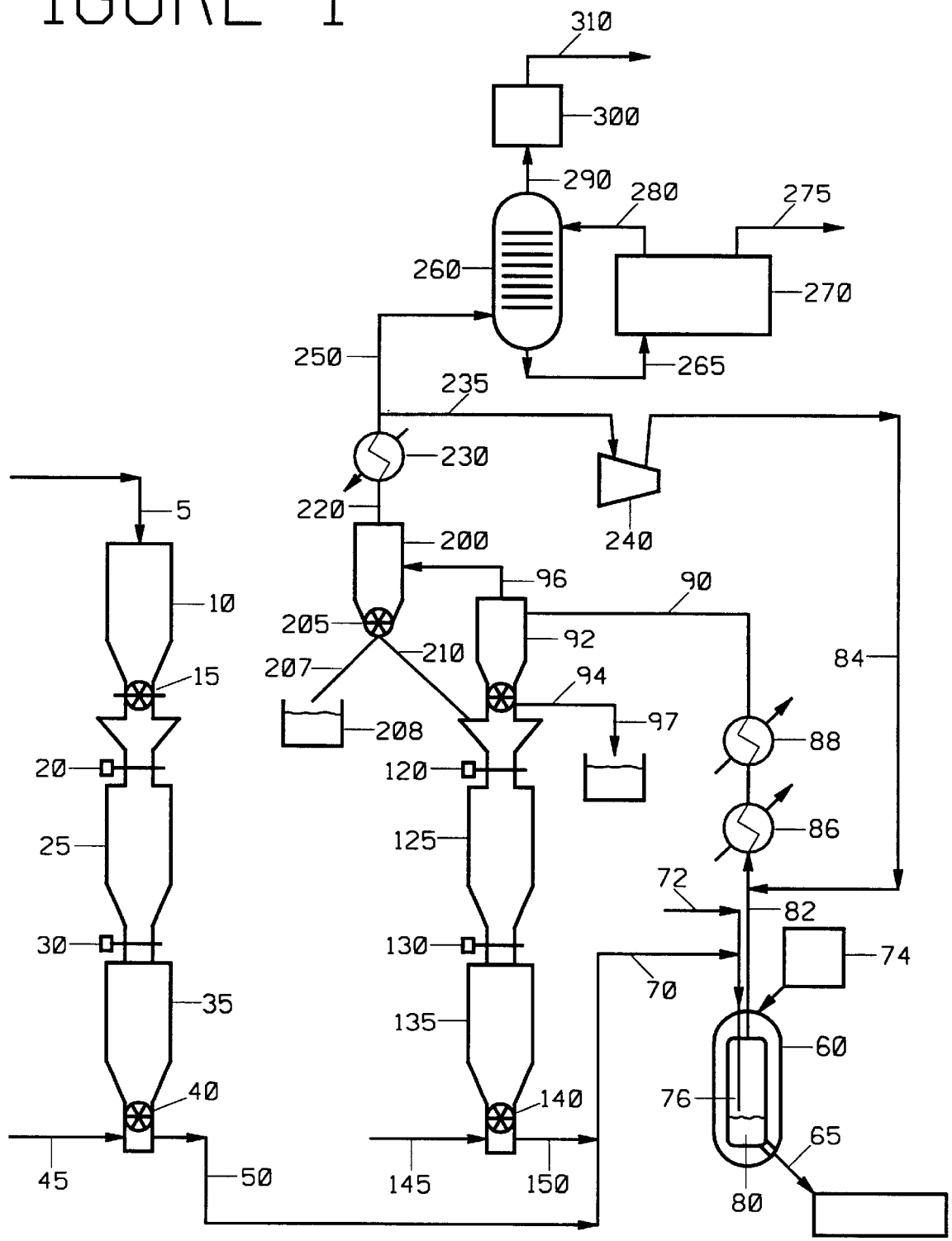

The petroleum coke feedstock may be any metal containing coke. Usually the coke will contain vanadium, nickel, and sulfur. Such materials are well known and widely available, they are produced wherever coking is used as an upgrading step for heavy Venezuelan crudes.

The coke may be sponge coke from a delayed coker, shot coke, fines from fluid coker, and the like. Some fluidized coking units partially burn some of the coke, yielding a coke product of enhanced vanadium concentration but generally still classified as coke despite the oxidative treatment.

In addition to coke, the feed may also comprise, or consist essentially of, liquid hydrocarbons. Thus the process may be used to process Venezuelan or other crudes which are contaminated with vanadium, or liquid or semi-solid fractions derived from such crudes.

Process Description

Referring to the FIGURE, a coke feed, typically a fine particulate feed having an average particle size less than 80 microns or even much smaller, is charged via line 5 to feed hopper 10. Coke is discharged via rotary valve 15 through open swing valve 20 into upper hopper 25. Coke is discharged down through swing valve 30 into pressurized hopper 35, from which it is continuously or intermittently discharged via rotary valve 40 into a flowing stream of steam from line 45. Other fluids may be used besides steam, but steam is preferred due to its ready availability and relative safety. The steam/coke mixture flows through line 50, is mixed with a preferred but optional recycle fines stream from line 150, and charged via line 70 into the HyMelt reactor 60. The coke/steam mixture is preferably discharged down via outlet 76 towards molten metal bath 80. Preferably the nozzle is close enough to the surface of metal bath 80 and is discharged with sufficient force to penetrate the metal bath.

Oxygen or oxygen containing gas is preferably co-fed with the coke. This allows a significant amount of preheating of the coke during its passage through the piping to nozzle outlet 76. A stream of iron-vanadium is continuously or intermittently withdrawn via line 65 as one product of the process.

Off gas and entrained droplets of iron/vanadium and/or perhaps some slag droplets are removed via line 82, quenched with relatively cool recycle gas from recycle gas line 84 and charged successively through heat exchanger 86 which produces high pressure steam and heat exchanger 88 which produces lower pressure steam. The temperature of the material withdrawn from reactor 60 is typically around 2800 F., while the temperature of the withdrawn vapor is reduced to 1000 F. and 350 F. respectively by passage through exchangers 86 and 88.

The reactor off gas and entrained solids are charged to cyclone 92 which recovers a low particulates vapor via vapor outlet line 96. A solids rich, dense phase fluidized phase is discharged via rotary valve 94, though the cyclone solids rich phase outlet may be sealed by other conventional means such as a flapper valve or immersion of the cyclone dipleg in a dense phase fluidized bed of particulates. The cyclone vapor phase is charged via line 96 to bag filter 200, which may be a conventional bag house or other gas/particulate separation means such as a third stage separator, electrostatic precipitator, or the like. A solids phase is continuously or intermittently removed via rotary valve 205 and charged via line 210 to admix with the cyclone 92 solids phase and pass via swing valve 120 into hopper 125 and swing valve 130 into recycle fines pressurized hopper 135. Pressurized fines are discharged via rotary valve 140 into flowing steam in line 145 to be recycled, with fresh fluidized coke feed, via line 70 to the HyMelt reactor.

The relatively particulate free vapor withdrawn via line 220 from bag filter means 200 may be further cooled using fin fan coolers, heat exchange with other process streams, or cooling water in cooler 230 to produce cooled vapor. A portion of cooled vapor is charged via line 235 to the inlet of recycle gas compressor 240 which discharges compressed recycle gas via line 84 to serve as quench stream. The remainder of the particulate free vapor is preferably charged through acid gas scrubber 260. Lean solvent in line 280 from solvent regenerator 270 is charged to an upper portion of the scrubber to contact acid gas. A relatively sweet gas stream is withdrawn via line 290 and charged via line 300 into ZnO treater 300 or equivalent clean up means to produce a purified gas stream which may be used as fuel or as a hydrogen rich syngas removed via line 310.

The rich solvent, with absorbed acid gas species, is removed via line 265 and recycled to solvent regenerator 270 which preferably recovers at least a portion of absorbed acidic sulfur containing gas species as H2S, which may be converted into elemental sulfur via a conventional Claus unit, not shown.

We claim:

1. Dissolving a V metal-containing coke or hydrocarbon feed in a molten metal bath comprising molten iron to produce a molten metal bath containing dissolved carbon and dissolved vanadium metal, exothermically oxidizing at least a portion of said dissolved carbon from said bath to produce carbon oxides which are removed from said bath as a product of the process to produce a heated bath containing dissolved V metal and wherein said oxidation is controlled and limited to maintain a carbon level of at least 0.5 wt % in said bath and produce a heated, carbon and V-containing bath; dissolving additional amounts of V-containing coke or hydrocarbon feed in said heated, carbon and V-containing bath, and repeating said exothermic oxidation and dissolution of V-containing feed, while maintaining said carbon level, to produce a molten metal bath containing more wt % vanadium metal as a dissolved metal than wt % carbon.

2. The process of claim 1 wherein said coke or hydrocarbon feed processing continues until the bath contains at least 10 wt % V on an elemental metal basis.

3. The process of claim 2 wherein the bath contains at least 20 wt % V.

4. The process of claim 3 wherein the bath contains at least 40 wt % V.

5. The process of claim 1 wherein said coke or hydrocarbon feed processing is continued until a predetermined V concentration is achieved in the bath, the bath is either dumped to recover a V/Fe metal product or a portion of the bath is withdrawn and at least partially replaced with fresh iron.

6. The process of claim 1 wherein the bath is run at superatmospheric pressure.

7. The process of claim 1 wherein oxygen or other oxygen containing gas is continuously introduced into the bath to produce CO and control carbon concentration.

8. The process of claim 1 wherein the carbon content of the bath is in excess of 1.0 wt % carbon.

9. The process of claim 1 wherein the carbon content is in excess of 4 wt %.

10. The process of claim 1 wherein the carbon content is at least 90% of the solubility limit of carbon in a pure iron bath at the same temperature.

11. The process of claim 1 wherein the carbon content exceeds the solubility limit of carbon in a pure iron bath and is present at a level that is dissolvable in a V/Fe solution.

12. The process of claim 1 wherein sufficient carbon is dissolved in the molten metal bath to ensure strongly reducing conditions which keeps the V in the elemental metal state dissolved in the metallic phase.

13. The process of claim 1 wherein said coke is admixed with steam and oxygen to produce a gas/particulate mixture which is added to said bath.

14. The process of claim 1 wherein said coke is discharged down into said molten metal bath at a velocity sufficient to carry at least a majority of said coke beneath the surface of the bath.

15. The process of claim 1 wherein coke is added via a coke addition means beneath the surface of the molten metal bath.

16. The process of claim 1 where said molten metal bath is disposed as a multiple zone bath, with either valving to permit swing bed operation or conduits permitting circulation of molten metal between zones and wherein at least one of said zones is operated exothermically and at least one of said zones operates endothermically.

17. The process of claim 1 wherein steam is added at least periodically to endothermically react with the carbon dissolved in the molten iron bath to produce a hydrogen rich synthesis gas.

18. The process of claim 1 wherein alkaline materials are added to said molten metal bath to react with and capture sulfur in said coke as slag.

19. The process of claim 6 wherein the bath is run at 2–200 atm pressure absolute.

20. The process of claim 8 wherein the carbon content of the bath is in excess of 2 wt. %.

21. The process of claim 8 wherein the carbon content is in excess of 3 wt. %.

* * * * *